Aug. 25, 1942.           L. V. LUCIA           2,293,741
TIMING DEVICE
Filed Oct. 22, 1938
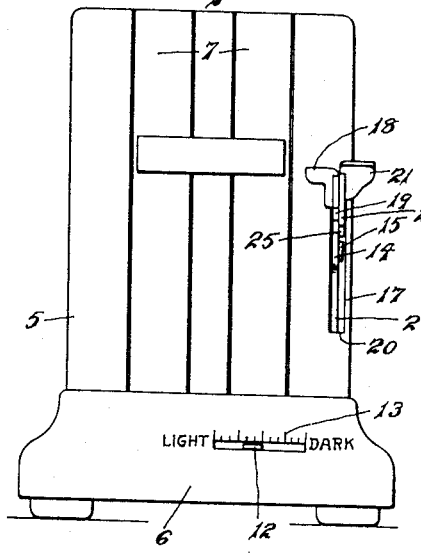
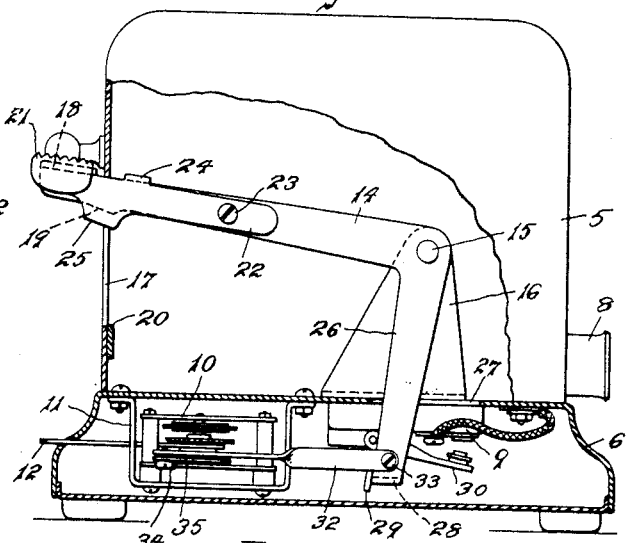
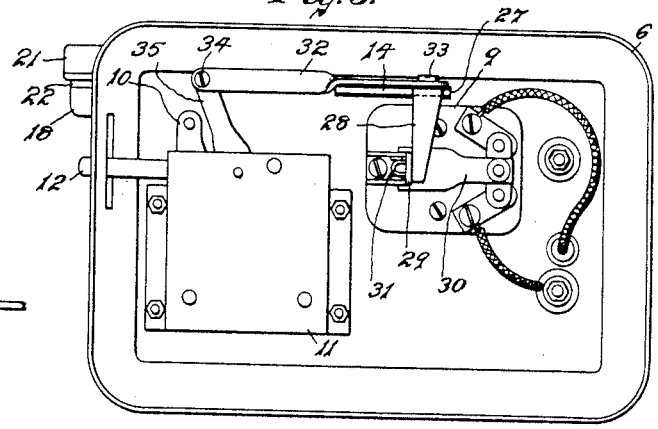
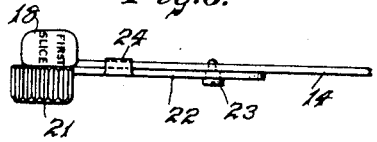
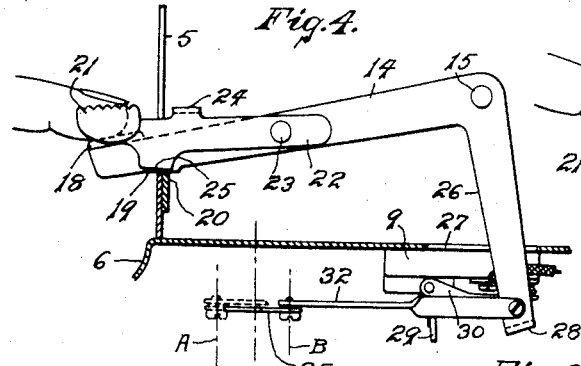
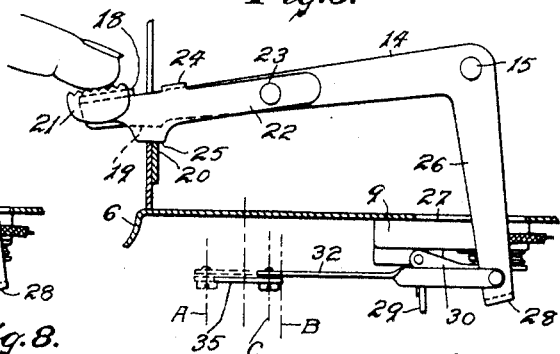
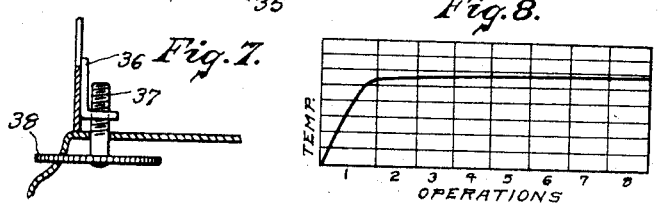
Inventor
Louis V. Lucia Patented Aug. 25, 1942

2,293,741

UNITED STATES PATENT OFFICE 2,293,741

TIMING DEVICE

Louis V. Lucia, West Hartford, Conn.

Application October 22, 1938, Serial No. 236,484

9 Claims. (Cl. 161—16)

This invention relates to timing devices and more particularly to that class of devices which are used for controlling the operation of automatic electric heating or cooking appliances, such as electric toasters, waffle irons and the like, in which such timing devices are employed to terminate each heating operation at the expiration of a predetermined period of time.

Heretofore, considerable trouble has been experienced in the timing of the heating operation of such appliances for the reason that uniform results cannot be obtained, in successive operations, when the period of time provided for each operation is of the same duration; this being due to the fact that a certain amount of heat is absorbed by the appliance and particularly during the time period provided for the first operation thereof.

Such trouble is particularly objectionable in automatic electric bread toasters since it is important to have each of the bread slices toasted to a substantially uniform degree and it is impossible to obtain the same degree of toasting within a predetermined period of time when the toaster is relatively cold and has not reached a temperature at which its capacity to absorb a portion of the heat generated therein, has been reduced to a point where it will not materially affect the toasting operation.

It is well known that in electric toasters, where timing devices are employed which provide a uniform period time for each operation of the toaster, the first of a series of bread slices toasted therein cannot be toasted to the same degree as the succeeding slices for the reason that, during the first operation, the toaster is in a cold state and, therefore, will absorb a greater amount of the heat generated therein than it can absorb during the succeeding operation.

It has been found, by long experience, that the toaster will become heated to a practically constant temperature during the time period provided for the first operation thereof and that, thereafter, each of the successive bread slices will be toasted to a satisfactorily uniform degree.

For this reason, it has been customary for certain manufacturers of toasters to instruct the users that the toaster should be given the first operation to allow it to become heated before the first bread slice is inserted therein. This has not proven very satisfactory for the reason that the users will not follow the instructions and attempt to toast the first bread slice without permitting the toaster to first become heated.

Other manufacturers have employed the use of thermally responsive means for varying the length of the time periods in proportion to the temperature of the toaster. Such means, however, add considerably to the coast of manufacture and provide a source of trouble due to the tendency of the mechanism to get out of order.

An object of my present invention, therefore, is to provide means which will eliminate the necessity of pre-heating the toaster before the first bread slice is inserted therein which will not require the use of thermostats or other thermally operated means, and whereby the timing device of an appliance, such as above mentioned, may be set to provide a longer time period for the first operation of the appliance and a shorter period of time for the succeeding operations.

Further objects and advantages of this invention will be clearly understood from the following description and from the drawing in which:

Figure 1 is an end view of an electric toaster comprising my invention.

Figure 2 is a side view thereof with parts broken away to show my invention as applied thereto.

Figure 3 is a bottom view of the same with the bottom plate removed therefrom.

Figure 4 is a view illustrating the operation of my invention for setting the timing device to provide the time period for the toasting of the first bread slice.

Figure 5 is a similar view illustrating the operation for setting the timing device for the toasting of the succeeding bread slices.

Figure 6 is a fragmentary plan view of my improved setting means.

Figure 7 is a view illustrating a modified form of an adjusting means which may be used in connection with my invention.

Figure 8 represents a chart illustrating the rate at which an electric toaster becomes heated.

In the said drawing, I have shown only those portions of the toaster, and of the timing device, which are necessary for a clear understanding of this invention and of the objects thereof.

As illustrated in the drawing, the numeral 5 denotes a housing, of a conventional form for an electric toaster, which is mounted upon a base 6 and which is provided with customary bread carriers 7 that may be of any desired form.

An electric plug receptacle 8 is provided in which terminal posts are mounted for supplying electric current, through a suitable connection, to the usual heating elements of the toaster, which are not shown. An electric switch 9 is mounted in the base 6 for controlling the supply of electric current to the said heating elements and a timing device 10, preferably mounted in a support 11, is driven by means of a main spring which is of a conventional form, not illustrated herein, and which operates to open the switch 9, at the expiration of a predetermined time period for which it is set to terminate the heating operations of the toaster. The time period provided by the timing device may be adjusted by means of the timing adjustment lever 12 which extends through the base and registers with insignia 13, upon the outside thereof, whereby the timing device may be set for obtaining the desired degree of toasting from the heating operation of the toaster. This manner of adjusting the timing device by means of the lever 12 provides a fixed adjustment and regulates the termination of the time period by selectively controlling the point at which the gear train of the timing mechanism is released from the main spring to terminate the timing operation. The operation of the mechanism of said timing device, whereby the timing operation is terminated, is well understood by those skilled in the art and, therefore, not described in detail herein.

By my present invention, I provide means whereby time periods of two different lengths may be obtained through the operation of the said timing mechanism, without requiring a change in the fixed adjustment thereof for the termination of the time period. In other words, my invention provides for obtaining time periods of different lengths by a simple variation of the manual operation which is required for winding the timing device to initiate the timing operation thereof.

As clearly illustrated in the drawing, I provide a setting lever 14 in the form of a bell crank which is pivoted at 15 upon a support 16 which is mounted inside of the toaster housing and preferably upon the base 6.

The said setting lever 14 extends through a slot 17 in the housing 5 and has thereon an operating button 18, which is adapted to be operated by a finger of the person using the appliance, and the lower edge of the said lever 14 is provided with a stop engaging portion 19 which is adapted to strike a stop 20, provided at the bottom of the said slot 17, so as to limit the movement of the said lever 14. A separate operating button 21 is mounted upon a member 22 which is pivoted at 23 upon the lever 14. The said member has a stop 24 which engages the upper edge of the lever 14 and a stop engaging portion 25 at the lower edge which is also adapted to strike the stop 20. The said setting lever 14 has a portion 26, which extends downwardly therefrom through a slot 27 in the base 6, and an extension 28, at the end of said portion, which engages the finger 29, on the rocker arm 30 of the electric switch 9, so as to operate the same to open said switch against the tension of the spring 31 which closes said switch when the said finger is released. A tie bar 32 is pivotally connected at one end thereof, as at 33, to the portion 26 of the lever 14 and at the other end, as at 34, to the winding lever 35 of the timing mechanism.

The operation of my invention is as follows:

Assuming that the toaster is connected to an electric circuit for successively toasting a number of bread slices and that it is in a cold state. The first bread slice is inserted in the toaster and the setting lever 14 is rocked by pressing downwardly on the operating button 18. This will rock the said lever and wind the timing device until the stop engaging portion 19 thereof engages the stop 20 and the lever is in the position clearly illustrated in Figure 4. During the movement of said lever, the extension 28 at the bottom thereof will have released the finger 29 and permitted the switch 9 to close the electric circuit; thus energizing the heating element of the toaster. At the same time, the portion 26 will have, through the tie bar 32, moved the winding lever 35 from the position indicated by dotted line A to the position shown on line B; thus winding the timing mechanism to the extent which was determined by the engagement of the stop engaging portion 19 with the stop 20.

Upon the release of the button 18, the timing mechanism will be set in motion, by means of the tension of the main spring acting upon the gear train, to provide a time period for the toasting of the bread slice and the lever 14 will be returned towards its normal position by the operation of the said timing mechanism.

When the timing mechanism has reached the posiiton which is predetermined by the fixed adjustment made with the lever 12, the said main spring will be released from the gear train and will at once return the lever 35 to its normal position. This will operate the link 32 and cause the lever 14 to be also returned to its normal position. At the same time, the extension 28 will engage the finger 29 and open the switch 9; thereby terminating the toasting operation.

It will be understood that the adjustment which is made with the lever 12 remains fixed, since it is intended for adjusting the length of the time periods in accordance with the degree of toasting which is desired, and that the length of each time period is, therefore, dependent upon the extent to which the timing device is wound by the operation of the lever 14.

As will be clearly understood from the chart in Figure 8 of the drawing, the toaster will become heated, by the heat generated by the heating element during the time period provided for the first toasting operation, to a point where it will have reached a practically constant temperature. During the succeeding toasting operations, practically all of the heat generated by the heating elements will be applied to the toasting of the bread slice and, consequently, a shorter period of time will be required for the succeeding toasting operations than was required for the first operation. Therefore, for each of the toasting operations succeeding the first one, the operating button 20 is pressed downwardly instead of the button 18. This will cause the lever 14 to be rocked downwardly, by means of the stop 24 engaging the upper edge of said lever, until the stop engaging portion 25 on the member 22 engages the stop 20, at which time the said parts will have assumed the position clearly illustrated in Figure 5 of the drawing.

It will be noted, that when the lever 14 has assumed this position, it will have traveled a lesser distance than it traveled when the button 18 was pressed. Therefore, the winding lever 35 will have traveled only for the distance between the lines A and C, which is less than the distance between the lines A and B, and the timing mechanism will have been wound to a lesser extent so that the time periods provided when the lever 20 is operated are shorter than those provided when the button 18 is operated. Consequently, a shorter period of time is provided for the toasting operations which follow the first operation, with the result that the bread slices toasted after the first operation will be toasted to the same degree as the bread slice which was toasted in the first operation; thus a uniform degree of toasting is obtained for all of the bread slices.

In summary, I have provided simple and inexpensive means whereby the timing mechanism of an electric heating device may be actuated to provide a longer period of time for the first heating operation thereof, while the said device is absorbing a substantial portion of the heat generated therein, and a shorter period of time for the succeeding operations when the absorption of heat by the device has reached a negligible point. In effect, my invention provides for the winding of a timing device to a certain extent by the operation of one member and to a different extent by the operation of another member.

In the modification illustrated in Figure 7 of the drawing, I have shown an adjustable stop 36 which is raised or lowered by means of a screw 37 that is turned by means of an adjustment disc 38 extending through a slot in the base 6. This type of a stop may be used, in place of the adjustment means which are operated by the adjustment lever 12, for making the fixed adjustment, above described, for regulating the degree to which the bread slices are to be toasted.

When the said adjustable stop 36 is used, the point at which the winding lever 35 of the timing mechanism is released from the main spring will be permanent and the desired adjustment of the timing device is obtained by raising or lowering the adjustable stop 36 to adjustably limit the amount to which the timing mechanism is wound by the lever 14. The difference, which it required between the length of the time period for the first operation of the toaster and that of the time periods for the succeeding operations, is obtained in the manner above described by the different extent to which the lever 14 will wind the timing device when the said lever is operated by means of the button 21 instead of by the button 18.

It is desired to have it understood that while I have shown one form of my invention in which the same is applied to a particular type of timing mechanism, the same may be modified and used in connection with other types of devices, or means for controlling the operation of toasters or cookers without departing from the scope of my invention as set forth in the appended claims.

I claim:

1. In a device of the character described comprising timing means for terminating the operation thereof at the expiration of a substantially pre-determined period of time; a member for setting said timing means to provide said period of time, a stop for limiting the movement of said member and separate means on said member for operating the same and engageable with said stop for limiting the setting movement of said member to set said timing means to provide a different period of time; said separate means being yieldable upon engagement with said stop to permit independent operation of the said setting member.

2. In a device of the character described comprising timing means for terminating the operation thereof at the expiration of a substantially pre-determined period of time; a member for setting said timing means to provide said period of time, a stop for limiting the movement of said setting member, separate manually operable means on said member for operating the same and engageable with said stop for limiting the movement thereof to set said timing means for a different period of time; said separate means being normally adapted to yield upon engagement with said stop to permit independent operation of said setting member.

3. In a device of the character described comprising timing means for terminating the operation thereof at the expiration of a substantially pre-determined period of time; means for setting said timing device including a single member for setting said timing device to provide a pre-determined period of time, a stop for limiting the movement of said member, a handle for operating said member into engagement with said stop, and separate means including a separate handle carried by said member for operating the same and engageable with said stop in advance of said member to thereby limit the movement thereof for setting said timing device for a different period of time; the said separate means being yieldable upon engagement with said stop when the setting member is operated independently thereof.

4. A bread toaster of the character described comprising timing means for terminating the operation thereof at the expiration of different periods of time required for producing selected degrees of toasting, means requiring a single operation for setting said timing means for any selected degree of toasting, said setting means including a member adapted to be manually operated for setting said timing means to provide for a selected degree of toasting, and a second member movable relative to the first member and associated therewith for manual operation thereof to set said timing means to provide for a different degree of toasting, said second member including an abutment for limiting the movement of said first member when operated by said second member, said abutment being incapable of interfering with operation of said first member independently of said second member regardless of the relative position of said members.

5. A toaster of the character described comprising controlling means for terminating the operation of said toaster at the expiration of different periods of time required for producing selected degrees of toasting, means requiring a single operation for setting said timing means for any selected degree of toasting, said setting means including a member manually operatable for setting said timing means to provide a period of time for a selected degree of toasting, a second member movable relative to the first member and associated therewith for manual operation thereof to set said timing device to provide for a different degree of toasting, and abutment means adapted to contact the second member for limiting the movement of the first member when operated by the second member, said second member being incapable of interfering with the operation of the first member independently of the second member regardless of the relative position of said members.

6. In a toaster of the character described comprising controlling means for terminating the operation of said toaster at the expiration of different periods of time required for producing selected degrees of toasting, means requiring a single operation for setting said controlling means for any selected degree of toasting; said setting means including a member manually operatable for setting said timing means to provide for a selected degree of toasting, a second member associated with the first member for manual operation of said first member to set said controlling means to provide for a different degree of toasting, and abutment means engageable by the first member for controlling the operation thereof; said second member being incapable of interfering with operation of said first member independently of said second member regardless of the relative position of said members.

7. For a toaster of the character described, controlling means for terminating the operation of said toaster at the expiration of different periods of time for producing selected degrees of toasting, means requiring a single operation for setting said controlling means for a selected degree of toasting, said setting means including at least two members each manually operatable to cause setting of said controlling means, and abutment means on each of said members for controlling the operation thereof to cause setting of said controlling means for different degrees of toasting, said abutment means being incapable of interfering with the operation of either of said members independently of the other member regardless of the relative position of said members.

8. For a toaster of the character described, controlling means for terminating the operation of said toaster at the expiration of different periods of time required for producing selected degrees of toasting, means requiring a single operation for setting said controlling means for any selected degree of toasting, said setting means including an abutment, a member engageable with said abutment for setting said controlling means for a selected degree of toasting, and a manually operatable second member for operating said first member for setting said controlling means for a different degree of toasting, said second member being incapable of interfering with the operation of the first member independently of said second member regardless of the relative position of said members.

9. A bread toaster comprising means for automatically terminating the operation thereof at the expiration of different periods of time required for producing selected degrees of toasting, means requiring a single operation for setting said terminating means for a selected degree of toasting, said setting means including at least two manually operatable members each manually operatable for setting said controlling means to provide for a different degree of toasting, and abutment means for engaging said members to control the operation thereof, each of said members being incapable of interfering with the operation of the other member when the other member is operated independently thereof regardless of the relative position of said members.

LOUIS V. LUCIA.